United States Patent [19]

Cropper et al.

[11] Patent Number: 4,537,025

[45] Date of Patent: Aug. 27, 1985

[54] ELECTRONIC FUEL CONTROL WITH MANUAL TRAINING MODE

[75] Inventors: George D. Cropper, Newington; Anthony J. Gentile, Waterbury, both of Conn.

[73] Assignee: Chandler Evans, Inc., West Hartford, Conn.

[21] Appl. No.: 624,220

[22] Filed: Jun. 25, 1984

Related U.S. Application Data

[62] Division of Ser. No. 420,139, Sep. 20, 1982, Pat. No. 4,478,038.

[51] Int. Cl.$^3$ .................................................. F02C 9/28
[52] U.S. Cl. .................................... 60/39.281; 434/54
[58] Field of Search ................... 60/39.281; 434/35, 54

[56] References Cited

U.S. PATENT DOCUMENTS

| | | | |
|---|---|---|---|
| 2,633,188 | 3/1953 | Schorn et al. | 60/39.281 |
| 4,077,203 | 3/1978 | Burnell | 60/39.281 |
| 4,302,931 | 12/1981 | White et al. | 60/39.281 |
| 4,344,281 | 8/1982 | Schuster et al. | 60/39.281 |
| 4,368,618 | 1/1983 | Nave | 60/39.281 |

Primary Examiner—Louis J. Casaregola

[57] ABSTRACT

A fuel control for a gas turbine engine is operable in a training mode in addition to the conventional automatic and manual back-up modes. In the training mode the manual mode is simulated, with signals commensurate with operator action being delivered to the fuel metering valve actuator, while protection against exceeding the safe operating limits of the engine is provided.

3 Claims, 1 Drawing Figure

4,537,025

ELECTRONIC FUEL CONTROL WITH MANUAL TRAINING MODE

This is a division of application Ser. No. 420,139 filed 9/20/82 and now U.S. Pat. No. 4,478,038.

TECHNICAL FIELD

This invention relates to fuel controls for gas turbine engines and particularly to electronic fuel controls having a manual override. More specifically, the present invention is directed to the training of pilots in the manual operation of electronic gas turbine engine fuel controls and especially to the electronic simulation of the manual backup mode of operation of such fuel controls. Accordingly, the general objects of the present invention are to provide novel and improved apparatus and methods of such character.

BACKGROUND ART

Electronic fuel controls of the type employed to meter fuel to gas turbine engines are well known in the art. These prior art fuel controls are designed to permit the operator/pilot to manually position the main fuel metering valve in the event of a failure in the automatic metering valve positioning system. For a discussion of such manual backup systems, and the potential problems associated therewith, reference may be had to U.S. Pat. No. 4,302,931.

As discussed in U.S. Pat. No. 4,302,931, the typical manual backup system for an electronic control consists of a direct mechanical link between the pilots control lever and the fuel metering valve. This direct mechanical connection can be potentially dangerous in that no protection against overfueling is provided and, accordingly, excessive engine temperatures and turbine speeds or flame-out can result from excessively quick action by the pilot. It has been proposed, referring again to U.S. Pat. No. 4,302,931, to employ a secondary flow limiting valve downstream of and in series with the main fuel metering valve and to provide a control for this secondary valve which will prevent the pilot from exceeding safe operating limits when in the manual mode. The controls for such secondary valves, however, add complexity to the fuel control. Further, and in any event, it is important that pilots be trained in the proper operation of the manual backup system and that the training be accomplished in a manner which insures against exceeding the safety limits of critical engine operating parameters. Such safe training is not possible using prior art controls and practices.

DISCLOSURE OF THE INVENTION

The present invention overcomes the above-briefly described and other deficiencies and disadvantages of the prior art by providing a means for simulating the operation of an electronic fuel control manual backup system while simultaneously providing protection against exceeding the limits of the critical operating parameters of the engine. Thus, apparatus in accordance with the present invention comprises the addition of a training mode to an electronic fuel control. When in this training mode, the pilot may operate the manual backup of the fuel control and will be provided with a warning signal if his action, had it been performed with the manual backup system in full operation, would have produced engine overspeed, over-temperature, etc. Thus, in accordance with the present invention, the direct manual control of a main fuel metering valve of a gas turbine engine fuel control is simulated while protection against the exceeding of the engine operating limits is provided.

The present invention, comprises a hardware/software system which, when activated, simulates the manual backup system. When employing the present invention, control over the main fuel metering valve position is switched from the normal control functions to a training mode. In the training mode the metering valve position is, to the extent that there will be no departure from safe operation, a direct function of the pilot's control lever, i.e., the power lever angle (PLA). For limited rate movements of the PLA, the metering valve movement and engine response will be exactly the same as in the actual manual backup system. However, limiting values for selected operating parameters such as over-temperature, minimum and maximum fuel flow, and possibly overspeed and rate of change of speed, are retained in the training mode. If the pilot's actions tend to cause any of the limiting parameters to exceed its predetermined safe limit, the electronic control will prevent the excess by electronically disconnecting the PLA input and switching to a limited fuel flow command. Simultaneously, the pilot will be provided with a warning signal advising him that his actions, as applied to the PLA, have been too extreme.

BRIEF DESCRIPTION OF DRAWINGS

The present invention may be better understood and its numerous objects and advantages will become apparent to those skilled in the art by reference to the accompanying drawing which is a functional block diagram of a preferred embodiment of the present invention.

BEST MODE OF CARRYING OUT THE INVENTION

Figure 1:
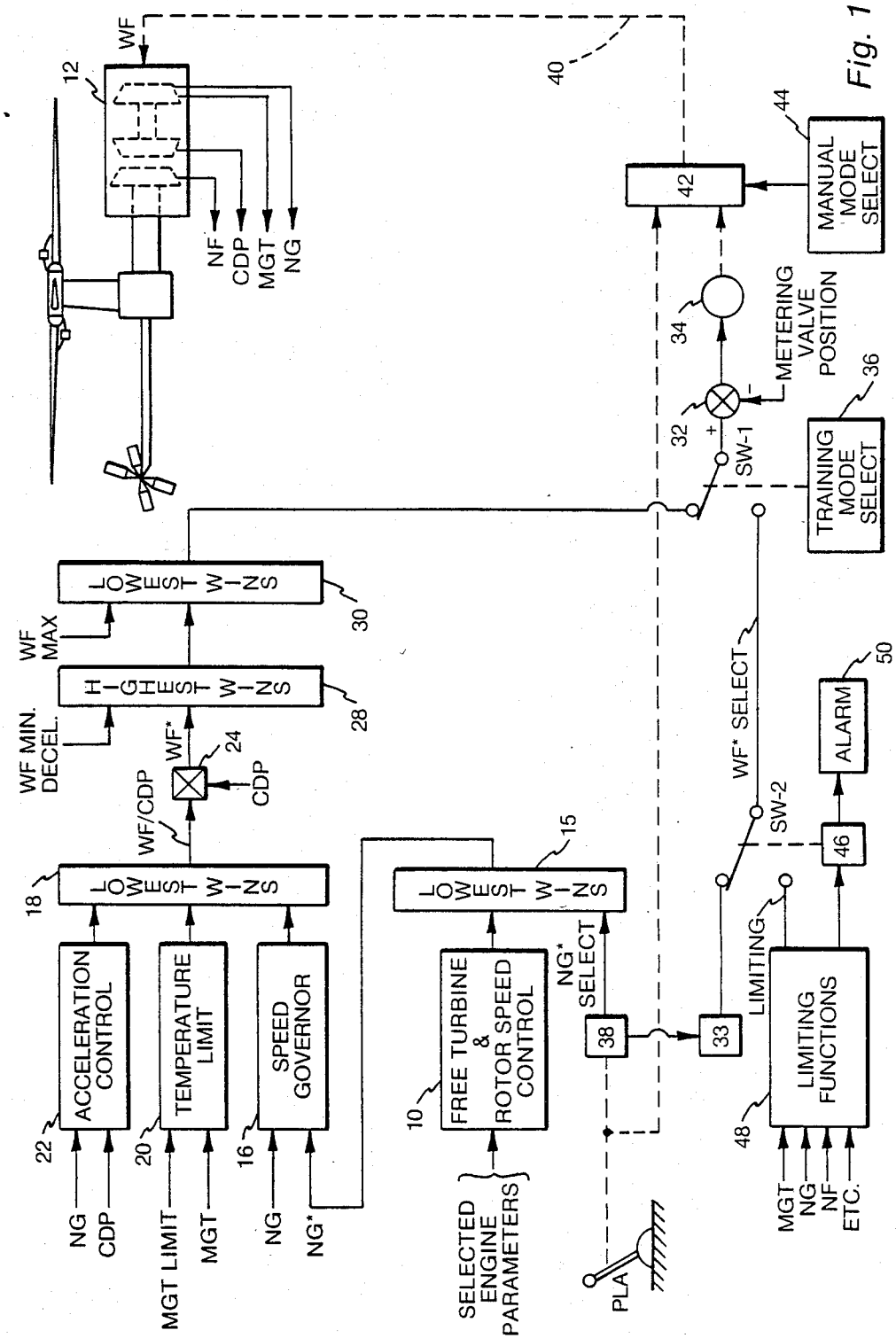

The present invention will, solely for purposes of explanation, be described in the environment of a turboshaft, i.e., a free turbine, engine such as employed to power a helicopter. In the example helicopter electronic gas turbine fuel control, the position of the main fuel metering valve is controlled electronically in response to various sensed engine operating parameters, i.e., gas turbine and power turbine speed, gas generator discharge temperature, ambient temperature and pressure, etc. Thus, the fuel control will compute, as a function of sensed operating parameters and programmed schedules, a fuel flow command WF signal which causes positioning of the main fuel metering valve. A manual backup system provides for control of the metering valve position via a direct mechanical linkage to the pilot's control lever (PLA) in the event of a failure of the electronic control. Thus, prior art electronic fuel controls have been characterized by two possible operational modes, i.e., the normal mode and the failure or mechanical backup system mode. In accordance with the present invention, the electronic fuel control is provided with a third operational mode which is a training mode.

In the control of the present invention the means for supervising the secondary metering valve 48 of above-referenced U.S. Pat. No. 4,302,931 is simplified whereby this valve will act merely as an over-speed prevention device. While the present invention could be explained in relation to U.S. Pat. No. 4,302,931, it is believed that understanding of the invention will be facilitated by reference to copending application Ser.

No. 369,494 which depicts an electronic fuel control of a type with which the present invention may be employed. Accordingly, the disclosure of application Ser. No. 369,494 is incorporated herein by reference.

Referring to the drawing, means for generating a speed command NG* signal is indicated at 10. The NG* signal generator will be a state-of-the-art free turbine/rotor speed control. The inputs to the speed command signal generator 10 will typically comprise the following:

NF—Free (power) turbine speed
NR—Main rotor shaft speed
C/P—Collective pitch command signal Command signal generator 10 is the primary electronic control for fuel flow to the engine, the engine being indicated schematically at 12.

A first NG* command signal provided by signal generator 10 is delivered, via a comparator circuit 15, to a speed governor 16.

Comparator circuit 15, also receives, as its second input, a second NG* signal commensurate with the setting of the pilots power lever, i.e., the PLA position which is the pilots rotor speed command. This pilot generated command signal is provided by a transducer 38. Comparator 15 selects, and passes to governor 16, the input signal thereto which corresponds to the lowest fuel flow rate.

Speed governor 16 is a conventional proportional controller which compares the selected NG* with the actual sensed gas generator speed NG, provides a speed error signal and multiplies that speed error signal by a constant to provide a first signal commensurate with fuel flow, i.e., WF, as a function of compressor discharge pressure, CDP.

The output of governor 16 is applied as a first input to a speed comparator circuit 18. A second input to circuit 18 comprises a temperature limit signal from a proportional temperature controller 20. Controller 20 receives, as its input signals, an MGT signal commensurate with actual gas generator tailpipe temperature and an MGT limit signal. If the actual sensed temperature exceeds the programmed limit, controller 20 will generate a fuel flow reduction command. Thus controller 20 will provide a second fuel flow related signal to comparator circuit 18, i.e., a second signal commensurate with fuel flow WF as a function of gas generator compressor discharge pressure CDP.

A third WF/CDP input signal to comparator circuit 18 is provided by an adaptive acceleration control 22. Acceleration control 22 receives, as inputs, signals commensurate with the sensed NG and CDP.

Comparator circuit 18 passes that one of the input signals thereto which corresponds to the least fuel flow. The signal selected by circuit 18 is applied as a first input to a pressure compensation circuit 24 which may comprise merely a multiplier. A second input to pressure compensation circuit 24 is a CDP signal commensurate with actual sensed gas generator compressor discharge pressure. Accordingly, the output of pressure compensation circuit 24 is the fuel flow demand signal WF*.

The WF* signal from compansation circuit 24 is delivered as a first input to a further comparator circuit 28. Comparator circuit 28 also receives a $WF_{min}$ signal derived from a deceleration schedule by a control, not shown. Comparator circuit 28 passes the input signal thereto which is commensurate with the highest level of fuel flow to a fourth comparator circuit 30. The second input to comparator circuit 30 is a $WF_{max}$ signal commensurate with the maximum permissible rate of fuel flow to the engine. Comparator circuit 30 will pass that input signal which calls for the lesser rate of delivery of fuel.

The WF signal selected by comparator circuit 30 is applied, via the normally closed contacts of a switch SW-1, as a first input to a summing circuit 32. The second input to summing circuit 32 will be a feedback signal commensurate with the actual metering valve position, i.e., the actual fuel flow rate. Accordingly, summing sircuit 32 provides, at its output, a fuel flow rate error signal which, after appropriate processing in circuitry which has been omitted from the drawing, may be applied as the control input to a stepping motor 34 which actually positions the metering valve. The state of switch SW-1, which is the training mode select switch, is controlled by an actuator which has been indicated at 36. Switch SW-1 is shown in its normal position, i.e., the position wherein the fuel flow rate is being supervised by the electronic control.

It is to be noted that switch SW-2 will be operated to its second state by a pilot input to the actuator 36. In this second state, i.e., in the manual mode which will be selected upon failure of the electronic control, the output of a transducer 38 which is connected directly to the pilot's control lever PLA may be applied directly to the metering valve positioning motor 34. However, as an alternative, there may be a direct mechanical connection between the PLA and the metering valve. This mechanical connection will be selectively established or broken as a function of the state of the actuator 36. Such selective mechanical interconnection is described in above-referenced U.S. Pat. No. 4,302,931 as well as in U.S. Pat. No. 4,077,203. Thus, it is to be understood that switch SW-2 and its actuator 36 constitute a schematic illustration of any of several electrical, mechanical or electro-mechanical means for isolating the input signal to motor 34 from the remainder of the apparatus upon selection of the manual mode while simultaneously establishing a direct operative connection between the pilot's control lever and the fuel metering valve.

Switch SW-1 will be operated to its second state by a pilot input to training mode select actuator 36. With switch SW-1 in its second state, i.e., in the training mode, the output of the transducer 38, connected directly to the pilot's control lever PLA, will be applied to the first input to summing circuit 32 via a conditioning circuit 33. Circuit 33 scales the NG signal resulting from pilot action to WF units. Accordingly, except under the conditions to be described below, in the training mode the motor 34, and thus the fuel metering valve, will be electronically controlled as a function of the rotor speed selected by the pilot through operation of the PLA. It is to be noted that the mechanical connection between the output shaft of motor 34 and the fuel metering valve, which has been indicated at 40, may be selectively interrupted by means of an actuator 42 which may be of the type described in U.S. Pat. No. 4,077,203. Actuator 42 operates under the control of a manual mode selector 44. When the pilot operates the manual mode selector 44, direct mechanical coupling will be established between the PLA and the fuel metering valve. When in the normal or automatic control mode or the training mode, the mechanical coupling between the PLA and metering valve will be interrupted by actuator 42.

The NG* signal from transducer 38 is delivered to the normally open contact of switch SW-1 via the normally closed contacts of a switch SW-2 and the conditioning circuit 33. Switch SW-2 is operated, in the manner to be described below, by an actuator 46.

The control of the present invention further comprises a function generator 48 which receives, as inputs, the actual values of the gas generator compressor discharge temperature, gas generator speed, power turbine speed in the case of a turbo-shaft engine and possibly other limiting engine operating parameters. Function generator 48 will comprise essentially a look-up table wherein the actual values of the inputted engine operating parameters are compared to their limiting values. Should one of the sensed parameters approach within a preselected percentage of its limiting value, function generator 48 will provide a control input to actuator 46 such that the actuator will cause the operation of switch SW-2. Function generator 48 will simultaneously provide a WF output signal commensurate with a limiting rate of fuel flow which will prevent the exceeding of safe engine operating conditions. This limiting fuel flow rate signal will be applied to summing circuit 32 in place of the signal derived from the output of transducer 38. In addition to operating switch SW-2, actuator 46 will cause an alarm 50 to be energized whereupon the pilot will be warned that his actions have been too extreme. Function generator 48 may, for example, comprise merely a microprocessor with associated memories.

As should now be obvious to those skilled in the art, the present invention provides a means of training a pilot to operate his manual engine control back-up system. In accordance with the invention the main electronic control is employed to simulate the manual system. Control of metering valve position is switched from the normal control functions to a training mode where the valve position is a direct function of PLA. For limited rate movements of PLA, the metering valve movement and engine response will be exactly the same as for the actual manual back-up system. However, limiting functions such as over-temperature, minimum and maximum fuel flow, etc. are retained in the training mode. If the pilots actions tend to cause any of the retained limits to be exceeded, the control will prevent this from happening and will provide the pilot with a signal which will warn him that his control actions have been excessive.

While a preferred embodiment has been described, various modifications and substitutions may be made thereto without departing from the spirit and scope of the invention. By way of example, while the present invention has been described in the environment of a free power turbine-type engine, the invention is obviously suited for use with other types of engines. Accordingly, the present invention has been described by way of illustration and not limitation.

What is claimed is:

1. In a fuel control for a gas turbine engine, the fuel control being operable in either an automatic or a manual mode, the fuel control including a fuel metering valve which is automatically adjusted in response to a control signal delivered to a motor to provide an appropriate fuel flow rate in the automatic mode, the metering valve being manually adjusted in response to movements of an operators control member in the manual mode, the improvement comprising:

means for selectively operating the fuel control in a training mode which simulates the manual control mode, said training mode operating means including:

means for generating command signals commensurate with the movements of the operators control member;

training mode selector means for applying either said command signals or the automatic mode control signals to the metering valve adjusting motor;

means responsive to signals commensurate with a plurality of monitored engine operating parameters for generating a fuel flow limit signal and an alarm signal commensurate with a monitored engine operating parameter approaching its safe operating limit; and switch means responsive to said alarm signal for delivering either a limit signal or said command signals to said selector means whereby said command signals will be delivered to the motor in the training mode under normal operating conditions and a limit signal will be delivered to the motor in the training mode when the operator's actions as applied to the control member have been inappropriate.

2. The apparatus of claim 1 wherein said training mode operating means further includes:

alarm means responsive to said alarm signals for providing the operator with an indication that his actions have been inappropriate.

3. The apparatus of claim 2 wherein said selector means includes a second switch.

* * * * *